United States Patent
Heusser et al.

(10) Patent No.: US 6,761,186 B2
(45) Date of Patent: Jul. 13, 2004

(54) SEATED-TYPE VALVE FOR A DOUBLE-ACTION CYLINDER OF AN ELECTRIC DISCONNECTOR

(75) Inventors: Martin Heusser, Munich (DE); Georg Jemuller, Munich (DE)

(73) Assignee: Heilmeier & Weinlein Fabrik f. Oel-Hydraulik GmbH & Co. KG, Munich (DE)

( * ) Notice: Subject to any disclaimer, the term of this patent is extended or adjusted under 35 U.S.C. 154(b) by 36 days.

(21) Appl. No.: 10/269,634

(22) Filed: Oct. 11, 2002

(65) Prior Publication Data

US 2003/0079785 A1 May 1, 2003

(30) Foreign Application Priority Data

Oct. 15, 2001 (DE) .................................... 201 16 920 U

(51) Int. Cl.[7] ............................................. F15B 13/042
(52) U.S. Cl. ............................. 137/625.66; 91/417 R; 91/426
(58) Field of Search ............................... 91/417 R, 426; 137/625.66

(56) References Cited

FOREIGN PATENT DOCUMENTS

DE 3345720 A1 * 8/1984
EP 0074419 A1 * 3/1983

* cited by examiner

*Primary Examiner*—Gerald A. Michalsky
(74) *Attorney, Agent, or Firm*—Cook, Alex, McFarron, Manzo, Cummings & Mehler, Ltd.

(57) ABSTRACT

A seated-type valve S provided for the double-acted cylinder Z of an electric disconnector TS, comprises a housing G containing a slider closure element 7 and a separating actuating force generator C1 and a switch-on actuating force generator C2 for the slider closure element 7, respectively. At least the separating actuating force generator C1 is equipped with a piston D1 contained in an interior bore 23 of the slider closure element 7, which piston D1 abuts in the housing G without generating lateral forces for the slider element 7.

12 Claims, 2 Drawing Sheets

SEATED-TYPE VALVE FOR A DOUBLE-ACTION CYLINDER OF AN ELECTRIC DISCONNECTOR

Figure 1:
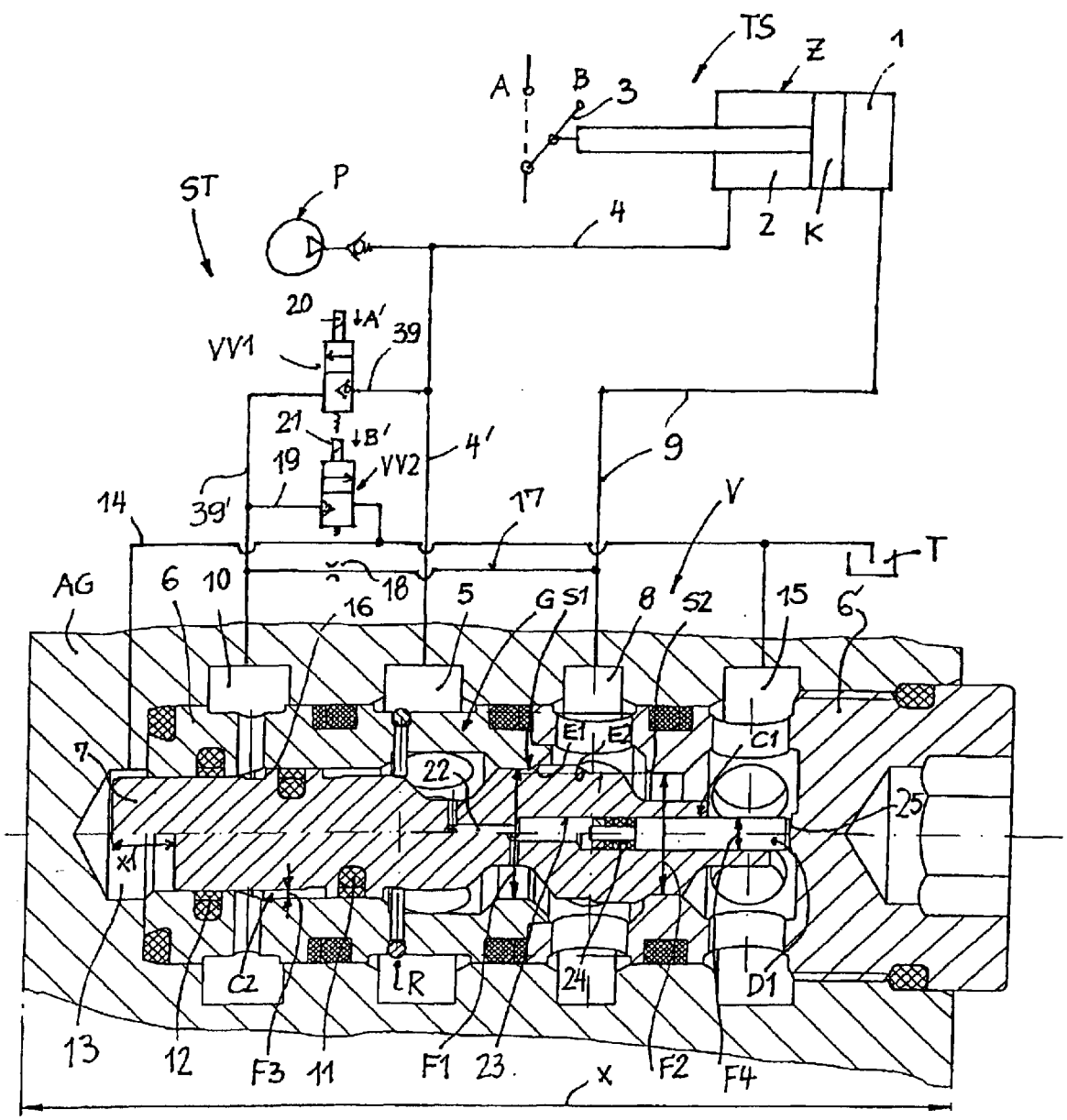

The switch-on actuating force generator of the seated-type valve of this kind according to DE 33 45 720 C is constituted by a piston-like integrated prolongation of the slider closure element, which prolongation is guided in sealed fashion in a small diameter section of the prolonged housing bore. The separation actuation force generator uses an integrated tube-like prolongation of the slider closure element situated in another prolonged section of the housing bore. Several drawbacks result from this design. The structural length of the slider closure element is large and results in an extremely long seated-type valve. A further disadvantage is that the sections of the bore used for the piston-like prolongation and the tube-like prolongation of the slider closure element have to be aligned particularly precisely with the valve seats in order to allow to displace smoothly the slider closure element without hindering lateral forces. This precise alignment only can be achieved by considerably high manufacturing efforts resulting in high manufacturing costs. This alignment, furthermore, hardly can be achieved reliably within a series of seated-type valves, because the housing has to be made from at least two parts to allow the mounting of the one piece slider closure element. Finally, the functionally important precise alignment cannot be maintained reliably during a long service life. The switching time durations are undesirably extended, since the structural length is large and a relatively big oil quantity has to be displaced over long distances during the switching cycles. For electric disconnectors, however, a cycle time of only several milliseconds is required particularly when switching the disconnector into the separating position. As production depending fluctuations cannot be excluded, which increase the displacement resistance of the slider closure element and which are detrimental for a correct alignment of the components as mentioned above, large pressure actuated areas are provided for safely generating sufficiently strong actuating forces further increasing the oil quantities which have to be moved during the switching cycles. For example, a large oil quantity has to be pressed back by the separating actuating force generator into the pump port and from the pump port through the first still strongly throttling pump valve seat into the cylinder port, when switching over from the separating position into the switch on position. This extends the switch-over time duration undesirably.

The housing of the seated-type valve known from EP 00 74 419 B is one piece while the slider closure element is assembled of two pieces. Both valve seats are of equal size. Both actuating force generators have pistons of differing sizes which are separated by the slider closure element and are slidably guided in the housing in the prolongation of the slider closure element The pistons are thus able to generate the actuating forces for the slider closure element without hindering lateral forces. For that reason, no precise alignment is necessary between the housing bore sections receiving the pistons and the housing bore section guiding the slider closure element However, as the pistons operate in prolongation of the slider closure element the valve itself has to have an undesirably large structural length. The divided design of the slider closure element is complicated. During the switching cycles relatively large oil volumes have to be moved over long distances.

It is an object of the invention to provide a structurally simple seated-type valve of the kind as disclosed above which is compact in moving direction of the slider closure element, which operates reliably during a long service life and in which during the switching cycles only minimum oil volumes are displaced over short distances.

The piston uses a part of the longitudinal extension of the slider closure element and does not protrude significantly beyond the slider closure element as it is operating in a telescopic fashion directly within an interior bore of the slider closure element This design allows to considerably reduce the structural length of the seated-type valve in the direction of the movement of the slider closure element The piston generates the separating actuating force for the slider closure element without hindering lateral forces such that the slider closure element is smoothly movable against very low displacement resistance. This safe operational behaviour can be achieved by a moderate manufacturing effort and in a cost effective way. Since the safety of constant low displacement forces of the slider closure element is unexpectedly high even during a long service life up to e.g. 30 years weak holding actuating forces for both end positions of the slider closure element may be set. This means that the first and second and pressure actuated surfaces are small-sized and advantageously can be designed ("risky") in terms of their mutual relative dimensional relationship and their relationship to the pressure actuated areas of the valve seats. Due to such small sized pressure actuated areas, however, only small oil volumes have to be moved over short distances during the switching cycles.

In an advantageous embodiment the pump seat area is larger than the tank seat area while the first pressure actuated area is made smaller than the second pressure actuated area. From these dimensional relationships short switching time durations for both switching directions and minimal moved oil volumes will result.

The second pressure actuated area is only about twice as large as the first pressure actuated area. Due to the constant smooth mobility of the slider closure element without hindering lateral forces and due to the low actuating forces in comparison with the risk-free high actuating forces of conventional seated-type valves of this kind a very small-sized first pressure actuated area suffices for a proper function. As a consequence, the second pressure actuated area can be of relatively small size as well. Minimal oil volumes then need to be moved.

The second pressure actuated area may be only about more than 20% bigger than the dimensional difference between both valve seats, resulting in short switching time durations of the disconnector. The tank valve seat, e.g., is about 12% smaller than the pump valve seat.

The structural length even can be decreased further when the switch on actuating force generator is provided with its own slidably guided piston which may, e.g., be supported in the housing without the possibility to generate lateral forces for the slider closure element Since the actuating force is imparted on the slider closure element without lateral forces the slider closure element may operate in the housing with a relatively short guided length. The resulting gain of longitudinal extension can be used to structurally integrate the second piston without an Increase of the structural length.

When the piston having the second pressure actuated area is inserted into an Interior bore of the slider closure element the structural length of the seated-type valve even can be reduced considerably, since the piston actually does not need to protrude beyond the slider closure element in the retracted position. In this case, two sealing zones are needed for the slider closure element within the housing bore. In case that the piston defining the second pressure actuated area is Inserted into an interior bore of the housing, then a single sealing zone of the slider closure element will suffice in the housing bore. This contributes to the easy and smooth mobility of the slider closure element such that relatively low actuating forces will suffice to reliably displace the slider closure element rapidly enough.

At least one circumferential sealing is expediently provided at the piston and for co-operation with the inner wall of the interior bore. The circumferential sealing can be positioned between supporting rings.

In order to safely exclude hindering lateral forces at the slider closure element the piston should be convexly rounded at least at one of the ends which end actuates the housing or the slider closure element, respectively. Optimally, even a sliding shoe is provided at this end of the piston.

In an alternative the switch on actuating force generator may use an annular surface provided as the second pressure actuated area at the slider closure element itself. The annular surface expediently may be provided in the guiding section of the slider closure element without increasing the structural length thereof.

The seated-type valve expediently is a screw-in cartridge for Insertion into an outer housing. This design is compact, facilitates the assembly, assures high tightness, and allows to use high quality material, e.g. hardened steel, only for the screw-in cartridge. The high quality material can be machined precisely and assures the permanent easy mobility of the slider closure element. To the contrary, the outer housing may consist of a lower quality material available for lower costs such that the entire costs of the seated-type valve can be kept at a moderate level.

The screw-in cartridge expediently is provided with two steel sleeves located behind each other. This simplifies the manufacture and the assembly. Each steel sleeve may be machined alone and may consist of high quality material. This allows to harden and grind e.g. the guiding sections of the housing bore and the valve seats. The material choice and the treatments allows to reliably use the valve over a long service life, e.g. up to 30 years.

For an easy manufacture it is expedient to form the housing of two parts and to form the slider closure element as one piece only.

Figure 2:
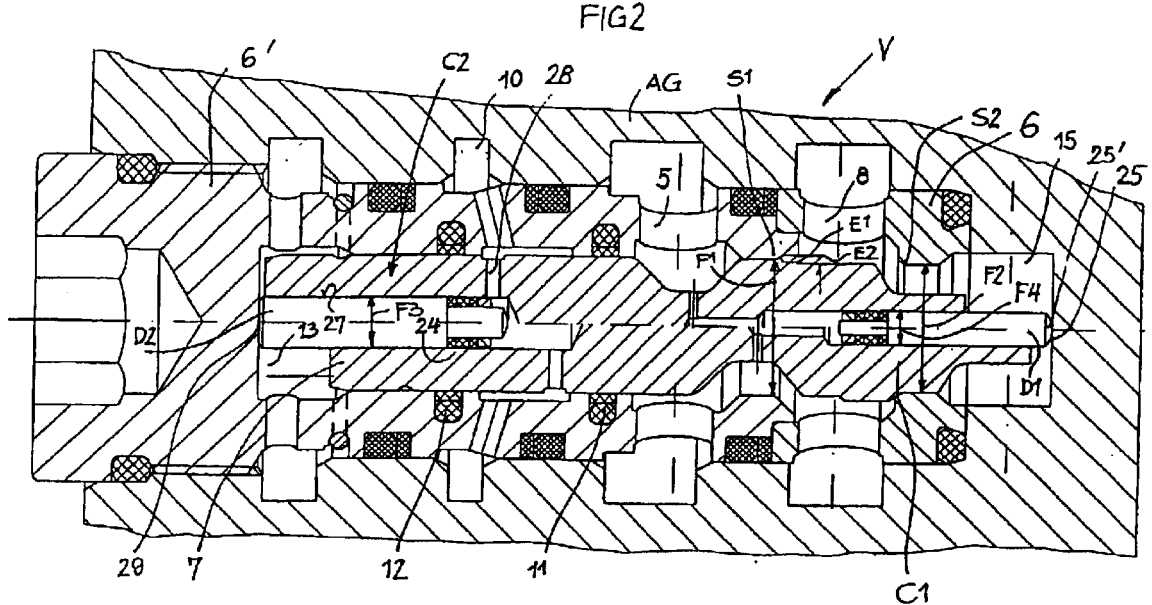
Figure 3:
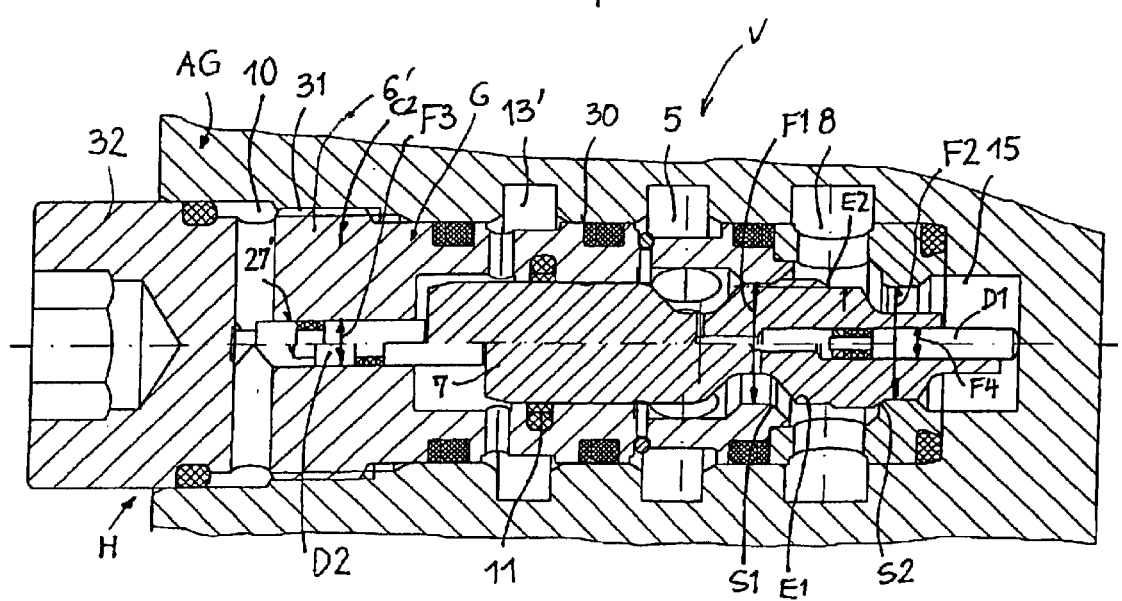

Embodiments of the invention will be explained with the help of the drawing. In the drawing are:

FIG. 1 a hydraulic control device of an electric disconnector, partially shown as a block diagram, and partially shown as a longitudinal sectional view, with two different switching positions of a seated-type valve above each other and separated by the central axis, FIG. 2 a longitudinal sectional view corresponding to the longitudinal sectional view of FIG. 1 of a further embodiment of the seated-type valve, showing two different switching positions separated by the central axis, and FIG. 3 a longitudinal view of a further embodiment in both switching positions.

An electrohydraulic control circuitry ST of an electric disconnector TS has the task to displace the disconnector TS back and forth within a few milliseconds between a separating position B shown in full lines and a switch-on position A shown in dotted lines. The control circuit only is one preferred embodiment of many possible embodiments and is indicated only schematically. According to a secondary aspect the electrohydraulic control circuitry ST has the task to hydraulically maintain the respective position A or B in case of a failure of the electrical part of the control device ST.

An actuator of the disconnector TS e.g. is a double-acted or a so-called differential cylinder Z, the double-acted piston K of which is separating a piston side chamber 1 from a piston rod side chamber 2. This piston rod of the piston K serves to actuate a separating element 3 of the disconnector TS. When both chambers 1, 2 contain at least substantially equal pressures, the disconnector TS is brought by the differential effect of the pressure actuated surfaces into the switch-on position A. In case that chamber 1 will be pressure relieved the pressure acting in chamber 2 is switching the disconnector TS into the separating position B.

The chamber 2 is directly connected via a pressure line 4 with a pressure source P, e.g. a charging pump. A pressure line 4' branches off from pressure line 4 and leads to a pump port 5 in a housing G of a seated-type valve V.

In the embodiment shown, the seated-type valve V has an outer housing AG Into which the housing G is screwed in. The housing G is formed e.g. by two sleeve-like housing parts 6, 6' set behind each other. The housing parts 6, 6' consist at least e.g. partially from hardened steel. A slider closure element 7 is slidably provided in sealed fashion within the housing G and can be displaced between two positions (upper half, left end position, lower half, right end position). A cylinder port 8 is provided in the housing G adjacent to the pump port 5 and separated by a pump valve seat S1 from the pump port 5. A pressure line 9 leads from cylinder port 8 to the chamber 1. A pressure line 39 branches off from pressure line 4' and leads via a solenoid actuated pilot control valve V, V1 and a further pressure line 39' to a control port 10 extending into the interior of the housing. A guiding section of the slider closure element 7 is located in this area and equipped with two spaced apart sealings 11, 12. The free end at the left side of the slider closure element 7 projects into a chamber 13 connected by a line 14 with a tank T. A tank valve seat S2 separates the cylinder port 8 in the housing G from a tank port 15 which Is connected to the tank line 14. In the vicinity of the cylinder port 8 a pump seat surface E1 and an axially spaced apart tank seat surface E2 are formed at the slider closure element 7. The pump seat surface E1 and the tank seat surface E2 alternatingly co-operate leakage free with the pump valve seat S1 or the tank valve seat S2. The pump seat surface E1 or the tank seat surface E2 is held in its respective closing position by a respectively maintained actuating force.

An annular shoulder 16 is formed in the guiding portion of the slider closure element 7. The annular shoulder 16 defines a second pressure actuated area F3 with the shape of annulus, A channel 17 branches off from the pressure line 39' and leads to the pressure line 9. A throttling aperture 18 Is provided within channel 17. Furthermore, a relief line 19 branches off from the pressure line 39'. The relief line 19 is connected via a second pilot control valve VV2 with the tank line 14. Both pilot control valves VV1 and VV2 are held by springs in the shown blocking positions and can be switched into their open positions by switching solenoids 20, 21 which are actuated by current respectively with a switch on signal A' or a separating signal B' in alternating fashion.

A channel 22 leading to a longitudinally extending interior bore 23 is formed within the portion of the pump port 5 in the slider closure element 7. The interior bore 23 contains a piston D2 defining a first pressure actuated area F4. The piston D2 is displaceably guided In sealed fashion by a circumferential sealing 24 positioned between two supporting rings. The piston D1 is an active part of a separating actuating force generator C1 of the seated-type valve V. The piston D1 may abut at a supporting surface 25 in the housing G or in the housing part 6', respectively, which supporting surface 25 is formed convexly rounded in this embodiment.

Furthermore, a switch on actuating force generator C2 is integrated into the seated-type valve S. An active component of the switch on actuating force generator C2 is the annular shoulder 16 or the second pressure actuated area F3, respectively. A pressure actuated area F1 is defined by the pump valve seat S1, while a further pressure actuated area F2 is defined by the tank valve seat S2. The pressure actuated area F2 is slightly smaller than the pressure actuated area F1, e.g. by about 12%.

The seated-type valve has a structural length x of e.g. 120 mm. Its slider closure element 7 may carry out a switching stroke x1 of about 7.5 mm.

As usual, a spring loaded, mechanical ratcheting assembly R is integrated into the seated-type valve in order to fix the respective switching position by a force fit Function:

In the illustration in FIG. 1 the control device ST is without power, provided that the pressure source P provides pressure. Both pilot control valves VV1 and VV2 are held by the springs in the shown blocking positions. The control port 10 is relieved via the relief line 17 to the pressure line 9, to which also the chamber 1 is pressure relieved (through the open passage gap between the tank seat surface E2 and the tank valve seat S2 and the tank port 15). In this case the second pressure actuated area F3 is not pressure actuated or is only actuated by the tank pressure in a direction to the right side. To the contrary, the pressure in pump port 5 is actuating the piston D1 such that the piston D1 abuts on the supporting surface 25 and generates the separating actuating force by which the slider closure element 7 (upper half in FIG. 1) is pressed to the left side with the pump seat surface E2 abutting on the pump valve seat S1. The disconnector TS maintains its separating position B.

In order to switch the disconnector TS Into the switch-on position A the switching solenoid 20 of the first pilot control valve VV1 is powered with current such the control port 10 is actuated by the pressure in pump port 5 through the pressure lines 39,. 39'. This pressure actuates the second pressure actuated area F3 in the displacing direction of the slider closure element 7 to the right side and shifts the slider closure element 7 over the operating stroke x1 into the right side position shown in the lower half of FIG. 1. The slider closure element 7 is displaced counter to the separating actuating force still maintained by piston D1. For that reason, the second pressure actuated area F3 is designed significantly bigger than the first pressure actuated area F4, e.g. Is made about two to four times as big as the first pressure actuated area F4.

The pump seat surface E1 now abruptly will be lifted from the pump valve seat S1 until the tank seat surface E1 abuts on the tank valve seat S2 and blocks in leakage-free fashion. The pump port 5 will be connected to the cylinder port 8. The chamber 1 is actuated via the pressure line 9 by the pressure in the pressure port. The disconnector TS switches into the switch-on position A.

In case that the power supply should fail, the switching solenoid 20 is returned by the spring of the first pilot control valve VV1. The first pilot control valve VV1 then blocks. The already reached position of the slider closure element 7 will be held hydraulically since the control port permanently is supplied with pressure from the pressure line 9 via the line 17 and the throttling aperture 18.

In case that the disconnector TS is to be switched into the separating position B, the power for the switching magnet 20 is switched off and switching solenoid 21 is supplied with power. The second control valve VV2 switches into its open position such that the control port 10 is relieved to the tank via the relief line 19 and the tank line 14. The second pressure actuated area F3 becomes pressure relieved, such that the still maintained separating actuating force of the piston D1 in the interior bore 23 comes into action moving the slider closure element 7 into the left side position shown in FIG. 1, upper part This position then is held hydraulically. In case of an electric power breakdown the pilot control VV2 automatically assumes its blocking position. However, the separating actuating force of the piston D1 further on remains effective.

The first pressure actuated area F4 is about half as big as the second pressure actuated area F3. The second pressure actuated area F3 is about double as big as the dimensional difference between the pressure actuated areas F1 and F2. The size of the second pressure actuated area F3 could amount up to about the fourfold of the dimensional difference F1–F2.

The embodiment of the seated-type valve V in FIG. 2 differs from the embodiment of FIG. 1 by another design of the switch-on actuating force generator C2. The guiding portion of the slider closure element 7 is formed without an exterior diameter shoulder but—to the contrary—with constant diameter. In an axial interior blind bore 27 of the slider closure element 7 a further piston D2 is slideably guided in a sealed fashion. The further piston D2 defines the second pressure actuated area F3 and can be brought into abutment at a housing stop 29 provided in the chamber 13 connected to the tank The abutment of the second piston D2 at the housing stop 29 serves to generate the switch-on actuating force for the slider closure element 7 which force is directed In FIG. 2 to the right side. A lateral connection bore 28 of slider closure element 7 selectively connects the interior bore 27 via the control port with the tank or supplies the pressure from the pump port 5 into the interior bore 27. At both sides of the lateral connection bore 28 from the control port 10 to the interior bore 27 axially spaced apart sealings 11, 12 are provided at the slider closure element 7. The outwardly facing end surfaces of pistons D1, D2 expediently are rounded convexly, as indicated at 25', in order to generate the actuating forces without any lateral force for the slider closure element 7.

The function of the seated-type valve of FIG. 2 corresponds to the function as explained with reference to FIG. 1. Furthermore, the structure of the separating actuating force generator C1 is identical.

The embodiment of the seated-type valve V of FIG. 3 is a modification of the embodiment of FIG. 2 and differs by a shorter slider closure element 7 and a switch-on actuating force generator C2 incorporated into the housing part 6'. Furthermore, the control port 10 is set a little bit further to the left side, while the chamber 13' connected to the tank T is located closer to the pump port 5 such that the left end of the slider closure element 7 is pressure relieved.

The piston D2 defining the second pressure actuated area F3 is slideable in sealed fashion in an axial through bore 17' of the housing part 6'. The piston D2 is actuated by the pressure in the pump port 5 (lower position in FIG. 3) via the control port 10 in order to actuate the slider closure element 7 by the switch-on actuating force counter to the separating actuating force simultaneously generated by the piston D1.

FIG. 3 illustrates that the seated-type valve V is formed as a screw-in cartridge made from steel. The housing part 6' of the interior housing G simultaneously defines a screw-in cap 32. The housing part 6' has a section with an exterior thread which section is threaded into an interior thread 31 of a bore 30 which is formed in the outer housing AG. Expediently, the end surface of the piston D actuating the slider closure element 7 is rounded convexly in order to transmit the actuating force without any lateral force. The guiding portions in the housing G and the valve seats S1, S2 may be hardened and ground like the parts of the slider closure element 7 co-operating therewith.

The measure to size the pressure actuated area F2 of the tank valve seat S to about e.g. 12% smaller than the pressure actuated area F1 defined by the pump valve seat S1 assures optimally short switching over time durations and contributes to the fact that only minimal oil volumes are to be displaced during the switching cycles.

The control circuit could be constituted differently than shown, even in view to the design and the arrangement of the pilot control valves VV1, VV2. It even is possible to use a single pilot control valve only.

What is claimed is:

1. Seated-type valve (S) for an actuating differential cylinder (Z) of an electric disconnector (TS), comprising a housing (G) provided with a pump valve seat (S1) and a tank valve seat (S2), said housing (G) containing a slider closure element (7) defining a pump seat surface (E1) and a tank seat surface (E2) at locations between the pump valve seat (S1) and the tank valve seat (S2) of said housing (G), a differential cylinder port (8) located in said housing (G) between the pump valve seat (S1) and the tank valve seat (S2), a housing pump port (5) at a side of said pump valve seat (S1) and a housing tank port (15) at a side of said tank valve seat (S2), a separation actuation force generator (C1) for the slider closure element (7) which separation actuation force generator (C1) has a first pressure actuated area (F4) of smaller size than each valve seat (S1, S2) which said first pressure actuated area (F4) is permanently actuated by pressure in said housing pump port (5) generating a separation actuation force oriented in a direction in which said pump seat surface (E1) abuts at said pump valve seat (S1), and a switch-on actuator force generator (C2) provided with a second pressure actuated area (F3) of smaller size than each valve seat (S1, S2) and of different size than the size of said first pressure actuated area (F4) which second pressure actuated area (F3) selectively either is relieved from or is actuated by said pressure in said housing pump port (5) for generating a switch-on actuation force oriented in a direction in which the tank seat surface (E2) abuts at said tank valve seat (S2), characterised in that at least said separation actuation force generator (C1) comprises a piston (D1) which is slideably guided in an interior bore (23) of said slider closure element (7), that said interior bore (23) is actuable by said pressure in said housing pump port (5), and that the piston (D1) is designed for a mechanical co-action with said housing (G) without creating hindering lateral forces for the slider closure element (7).

2. Seated-type valve as in claim 1, characterised in that the pump valve seat (S1) is larger than the tank valve seat (S2), and that the first pressure actuated area (F4) is smaller than the second pressure actuated area (F3).

3. Seated-type valve as in claim 1, characterised in that the dimensional relationship between the second pressure actuated area (F3) and the first pressure actuated area (F4) is larger than about 2:1.

4. Seated-type valve as in claim 1, characterised in that the second pressure actuated area (F3) is larger than the dimensional difference (F1–F2) of both valve seats (S1, S2), preferably larger by about 20% to 100%.

5. Seated-type valve as in claim 1, characterised in that the switch-on actuator force generator (C2) comprises a piston (D2) which is slideably guided in relation to the slider closure element (7), and that the piston (D2) is designed for a mechanical co-action with said housing (G) without creating hindering lateral forces for said slider closure element (7).

6. Seated-type valve as in claim 5, characterised in that the piston (D2) either is provided in an interior bore (27") of the housing or in an interior bore (27) of the slider closure element (7), and that the bore (27' or 27) selectively is actuable by the pressure in the housing pump port (5).

7. Seated-type valve as in claim 5, characterised in that the piston (D1, D2) is provided with at lest one circumferential sealing (24) arranged between two supporting rings.

8. Seated-type valve as in claim 5, characterised in that at least one end (25') of the piston (D1, D2), by which end the piston (D1, D2) when pressure actuated abuts in said housing (G) or at said slider closure element (7), is rounded convexly.

9. Seated-type valve as in claim 1, characterised in that the second pressure actuated area (F3) of said switch-on actuation force generator (C2) is defined by an annular surface (16) forward at said closure element (7).

10. Seated-type valve as in claim 1, characterised in that the seated-type valve (S) is constituted by a screw-in cartridge (H) inserted into an outer housing (AG).

11. Seated-type valve as in claim 10, characterised in that the screw-in cartridge (H) comprises two steel sleeves (6', 6) inserted behind each other into a bore (30) of the outer housing (AG).

12. Seated-type valve as in claim 1, characterised in that the housing (G) is divided into two parts, and that the slider closure element (7) is a one-piece part.

* * * * *